United States Patent [19]

Knowles

[11] Patent Number: 4,775,903
[45] Date of Patent: Oct. 4, 1988

[54] SAMPLED SERVO SEEK AND TRACK FOLLOW SYSTEM FOR A MAGNETIC DISC DRIVE

[75] Inventor: Vernon L. Knowles, Boise, Id.

[73] Assignee: Hewlett-Packard Company, Palo Alto, Calif.

[21] Appl. No.: 919,099

[22] Filed: Oct. 14, 1986

[51] Int. Cl.[4] .............................................. G11B 5/596
[52] U.S. Cl. ......................................... 360/78; 360/77
[58] Field of Search .................... 360/77, 78; 369/32; 318/561

[56] References Cited

U.S. PATENT DOCUMENTS

4,679,103 7/1987 Workman ............................ 360/78

Primary Examiner—Alan Faber
Assistant Examiner—David L. Robertson
Attorney, Agent, or Firm—Leslie G. Murray

[57] ABSTRACT

An improved method and apparatus for performing seek and track follow operations in a disc drive provides time varying acceleration profile and track position trajectory signals which have the same time duration and which are developed as a function of seek length. These signals are successively simultaneously sampled at the same points in time. The sampled acceleration profile and track position trajectory signals from the same points in time are simultaneously applied as a feed forward signal and a position reference signal, respectively, in the disc drive to position a magnetic head at a selected track. During a seek operation, each actual track position signal and subtrack position signal from the transducer is compared with an existing sampled track position trajectory signal. At the end of the seek movement, track following continues under the control of the subtrack position signals.

32 Claims, 5 Drawing Sheets

SAMPLED SERVO SEEK AND TRACK FOLLOW SYSTEM FOR A MAGNETIC DISC DRIVE

TECHNICAL FIELD

This invention relates generally to magnetic disc memory drives and more particularly to an improved sampled servo magnetic head positioning system in such a disc memory drive.

BACKGROUND ART

Magnetic disc memory drives comprise a plurality of magnetic memory discs axially spaced on a common shaft and driven at constant rotational speed. In one type of disc memory drive a single surface of one disc is provided with concentric tracks of servo code. The surfaces of the remaining discs have concentric tracks of recorded data. Corresponding tracks on the disc surfaces define track cylinders. An armstack supports magnetic heads in corresponding positions adjacent the surfaces of the discs. The head adjacent the servo code may be called the servo head and the other heads the data heads. A motor driven carriage coupled to the armstack moves the magnetic heads across the tracks or supports the heads at a selected track cylinder.

Control systems for such a disc memory drive have included dedicated servo arrangements for track cylinder seeking and track following using only a dedicated servo head. This assumes that track centering of the dedicated servo head results in track centering of the data heads which is unlikely when the track width is very small.

The dedicated servo approach limits track recording density because of mechanical tolerances in track recording, in magnetic head mounting on the armstack and in the changing physical relationships among the differing parts, for example, armstack tilt, or disc axis tilt, or both.

In sampled servo disc drives, instead of employing a disc surface and a magnetic head dedicated to servo code, the servo code is recorded on each disc usually in equally angularly spaced sectors in each track, interspersed with the data code. The head on each disc is then used in the control system loop for both track seeking and track following over the adjacent disc surfaces as well as for reading and/or writing.

In some of these systems, as referenced in U.S. Pat. No. 4,217,612 entitled "Servo System for Track Accessing and Track Following In a Disc Drive", filed Nov. 27, 1978, using the same drive system for both track accessing, or track seeking, and track following modes, after the addressed track has been reached, switching from the track seeking mode to the track following mode takes place. Switching is undesirable since it frequently results in switching transients or drive force discontinuities producing magnetic head oscillation, interfering with the speed and accuracy of positioning of the magnetic head.

Improvement was achieved, according to the teachings of U.S. Pat. No. 4,217,612, in the provision of a servo system which couples position error signals and position signals to a summing junction at the input to a compensator circuit in the control loop of the servo. With this arrangement there is no switching between track seeking and track following modes of operation which eliminates the switching transients causing the detrimental oscillations of the magnetic heads but control loop saturation is a problem.

Systems of the type referred to above and others, as described in U.S. Pat. No. 3,936,876, entitled "Rotatable Data Storage Apparatus with Track Selection Actuator Having Multiple Velocities", filed Jan. 21, 1974, U.S. Pat. No. 4,439,800, entitled "Servo Control of Seek Operations in Magnetic Disc Drive", filed Apr. 24, 1981, and U.S. Pat. No. 4,134,053, entitled "Method and Means for Capturing Magnetic Tracks", filed Oct. 26, 1976, during track accessing or track seeking, sometimes provide signals to the carriage motor or actuator control system, defining a velocity profile, to cause the magnetic head to be accelerated over a first predetermined distance to a selected velocity, to be moved at the selected velocity over a second predetermined distance, and to be retarded over the remaining distance so that the velocity of the head as it approaches the addressed or selected track is reduced to the value called the capture velocity that it may be captured and controlled by a track follower control for track centering. The track follower remains connected throughout the seek operation, however, it is not functional since its affect in the seek operation is swamped or overpowered by the seek power until the head velocity is reduced to track follower capture velocity.

Microprocessors or computers are used to provide velocity profiles for the control systems. Speed regulation in some systems has been provided using tachometer feedback in a closed control loop. In other systems as described in U.S. Pat. No. 4,333,117, entitled "Disc Head Arm Position Controller Using Digital Velocity Sensing", filed June 30, 1980, head velocity is measured using the transit time between adjacent tracks of the servo code. In still other systems such as described in U.S. Pat. No. 3,936,876, referred to below, the integral of the coil current and the derivative of the position error signal are used to provide a measure of head velocity. Such loop stabilizing feedback techniques add to system complexity and cost.

DISCLOSURE OF THE INVENTION

While such prior art disc drives have individually provided improvements in performance, further improvements in performance while simplifying the disc memory drive, according to one aspect of this invention, are achieved in an arrangement in which acceleration profile and time varying track position trajectory signals, both of which are related to seek length and have corresponding time durations, are respectively simultaneously coupled to an output section, as a feed forward signal, and to an input section, as a desired position signal, of a single track follower loop of a disc drive. The acceleration drive, the track position drive and a track following control, function simultaneously during the seek mode of operation to minimize tracking errors. At the end of a seek movement the track following control function continues.

Adaptive gain adjustment of the acceleration profile signal at the end of a seek movement is achieved by an off-track detector, the output of which adjusts the acceleration profile signal to compensate for overshoot or undershoot of a selected track in a succeeding seek move. By this expedient overshoot or undershoot of the target track is virtually eliminated. This seek adaption process corrects for manufacturing variations that exist in the actuator motor. Consequently all drives will tend to have the same seek characteristics.

Provision is also made for tailoring the time rate of change of the acceleration profile signal to the time constants of the actuator to minimize magnetic head overshoot at the selected or target track.

According to another aspect of this invention a track follower loop is provided which is always closed. A time varying track position trajectory signal is provided during a seek operation. The terminal end of the trajectory represents a desired track and subtrack position. The actual track position of the magnetic head as the seek movement progresses is subtracted from the sample point track position values along the trajectory up to and including the desired track position value at the terminal end of the trajectory to produce a partial position error. The desired track position value may define a desired track and a subtrack. The partial position error is then the difference between the actual track and the desired track plus the desired subtrack position. The actual subtrack position is then combined with the partial position error to obtain a final or net position error signal which represents the position error in tracks with subtrack resolution. By leaving the track follower loop closed at all times, the loop functions to follow the trajectory of the track position trajectory signal. By applying the acceleration profile signal as a feed forward input to the track follow loop, ie., to the output section of the loop, the loop need only correct for errors between actual track position and desired track position. Loop saturation problems are also avoided. A track following compensator is used in the input section of the track follow loop to stabilize the loop. By this expedient, the loop velocity state does not have to be measured or generated.

According to still another aspect of this invention odd/even track signals are combined with a servo code signal to produce a single error signal having a value that is valid anywhere over the memory disc surface. The character of this error signal is such that the track follower control loop always has negative feedback as distinguished from prior art drives, for example, of the type of U.S. Pat. No. 3,936,876, supra., which provides alternate negative and positive feedback (or the reverse) on odd and even tracks. Further, head to head misalignment when switching from one selected head to another can now be tolerated.

BRIEF DESCRIPTION OF THE DRAWINGS

The invention will be better understood by reference to the following specification when considered in conjunction with the accompanying drawings, in which.

BEST MODE FOR CARRYING OUT THE INVENTION

A disc drive comprising a sampled servo seek and track follower control loop for a high performance disc memory drive is disclosed herein. This control loop is a single servo loop that is used in an identical manner for both track following and track seeking modes of operation.

Figure 1:
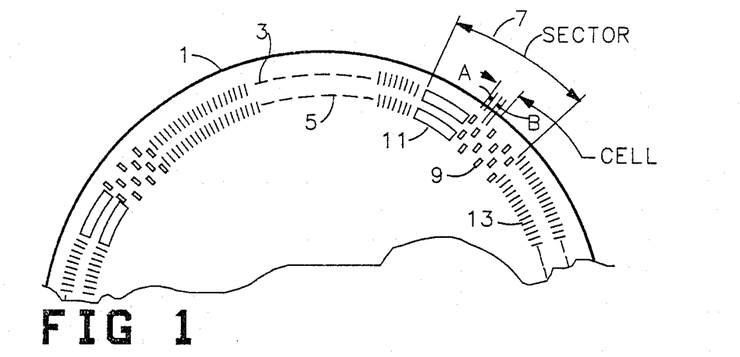
FIG. 1 is a plan view of a sector of a memory disc fragmentarily illustrating magnetically recorded tracks.

The character or format of track recordings employed in the present invention is depicted in FIG. 1 on a sector of a magnetic recording disc 1. Only a portion of two data tracks 3 and 5 are shown to demonstrate the general pattern of the magnetic recordings. Each track of the memory disc comprises a plurality of equally angularly spaced sectors 7 interspersed with recorded data. Each sector 7 comprises a section of servo code recordings 9 and a section of track number recordings 11. The servo code comprises magnetic zones or tranitions A and B in circumferentially spaced positions on opposite sides of the track centerline. The magnetic zones B are in circumferential positions intermediate the magnetic zones A.

The track numbers 11 are recorded in Gray code. The system requires knowledge of whether a track is even or odd. The track number in Gray code provides this information. A single bit also may be recorded with the track number code to indicate whether the track is even or odd if desired. The remainder of each track between the sectors 7 contains recordings of data 13.

Figure 2:
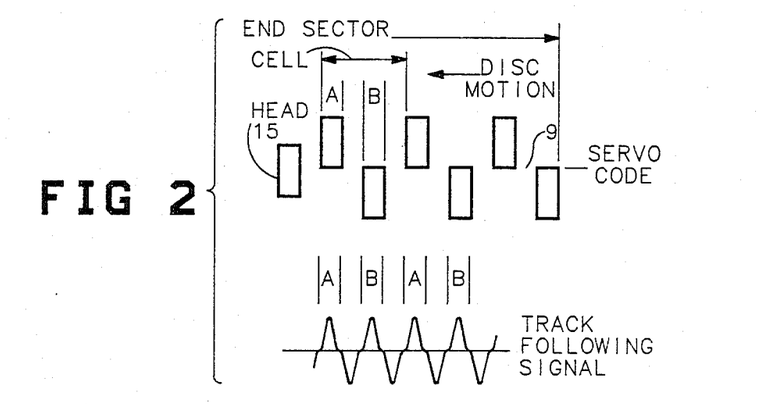
FIG. 2 is an enlarged plan view of a fragment of the magnetic zones or transitions of the sampled servo code defining a track and typical track centered track following signals which are shown therebelow.

Track following is achieved as a magnetic head traverses the servo code 9 in each sector 7, by determining the radial position of the magnetic head in relation to the magnetic zones A and B. FIG. 2 is an enlarged view of a fragment of the servo code 9 of one of the sectors 7 of FIG. 1. A magnetic head 15 is shown on the left in a track centered position. The surface of the disc 1, represented in the plane of the drawing, is of one magnetic polarity. The magnetic zones are of the opposite magnetic polarity. Disc motion from right-to-left, as viewed, beneath the magnetic head 15 generates servo code voltages in the magnetic head 15 which, after amplification and processing, are characterized by the time varying servo code wave forms A and B shown below and aligned with the magnetic zones 9. The difference between the A and B voltages (A-B) indicates the radial position of the magnetic head with respect to track center and is used in the track following mode of operation for keeping the magnetic head 15 track centered.

Figure 3:
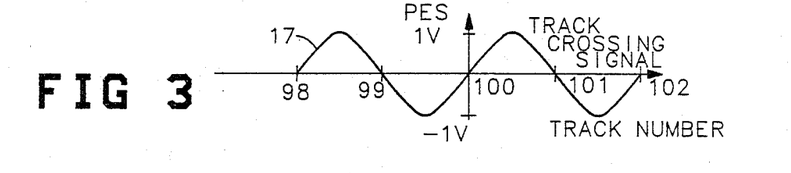
FIG. 3 illustrates a typical servo code derived track crossing signal.

During the seek mode of operation the magnetic head 15 is moved across the tracks from a present track position to a selected or target track. The servo code signal relationship (A-B) is now processed to produce a track crossing signal 17 of the type shown in FIG. 3, which arbitrarily spans the centers of tracks 98 to 102. At track center the servo code signal (A-B) is zero, becoming maximum (positive or negative) at half track positions when the magnetic head is aligned, respectively, with either an A or a B magnetic zone. When this track crossing signal 17 is used as feedback of magnetic head position in relation to a track center, the feedback voltage is alternately positive and negative with even and odd track center crossings.

Figure 4:
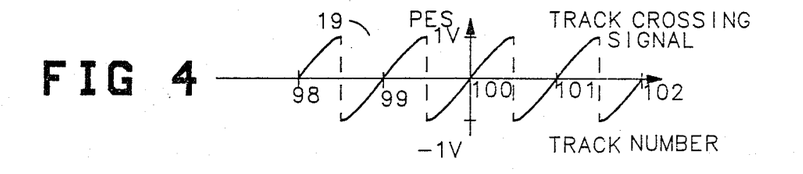
FIG. 4 illustrates the corrected track crossing signal of this invention.
Figure 5:
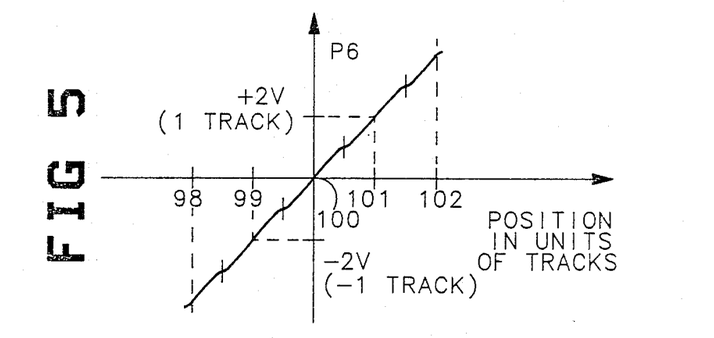
FIG. 5 is a plot of a track position error signal based upon the corrected track crossing signal of FIG. 4.

By combining the track address (odd/even) or the odd/even bit recorded in the track addresses, with the track crossing signal 17 (FIG. 3) (known also as the fine servoposition signal) a corrected track crossing signal 19 is produced, as illustrated in FIG. 4, in which the negatively sloped portions of the track crossing signal 17 are inverted. The resulting demodulated position error voltage P6 is shown in FIG. 5. This position error signal is valid over all of the tracks on the disc. As a result, the control loop always has negative feedback.

Seek movement is initiated and performed by coupling acceleration profile and desired track position trajectory signals to the track following loop. These are shown in the upper and lower portions, respectively, of FIG. 6. The acceleration profile signal CC2 is defined as an acceleration current having a profile, the time rate of change of current or acceleration, for moving the actuator to position a selected or target head at a designated track without overshoot or undershoot. The desired track position trajectory signal P1 is defined as a time varying track position trajectory signal, which is the time rate of change of track position. These signals begin and terminate simultaneously. They are based upon known characteristics of the system. The acceleration values for different length seeks are tabulated and stored and are accessed as a function of seek length. There is a single position displacement table that corresponds to full power acceleration. The acceleration signal profile CC2 and the track position trajectory signal P1 have designated sample points which are equal time divisions on the common time axis of the signal plots. In practice, signal values on each signal are sampled in corresponding sequential time intervals. Their midway and terminal sample points represent the midpoints and terminal points, respectively, of a seek movement. The acceleration profile signal CC2 is zero at the midpoint of the seek movement at which point it reverses to initiate actuator retardation, and, ideally, is zero again at the termination of the seek movement. The position trajectory signal is a parabolic function (voltage/current) plotted, in FIG. 6, as track position per unit or interval of time. The acceleration profile is trapezoidal to match the slew rate capability of the actuator.

A system which implements the principles described above is illustrated in FIG. 7 which comprises a track follower loop 21 having an input section 23 and an output section. The input section conventionally includes a compensator circuit 27 and a notch filter circuit 29 coupled to the input of a power amplifier 31 in the output section 25 by means of a summing junction 32. The power amplifier 31 drives an actuator 33 which carries and moves an armstack 35 on which the magnetic heads H1, H2 and H3 are conventionally flexibly mounted. Either a linear or rotary actuator for armstack 35 is contemplated for the purpose of moving the magnetic heads as a unit across the associated discs.

Figure 7:
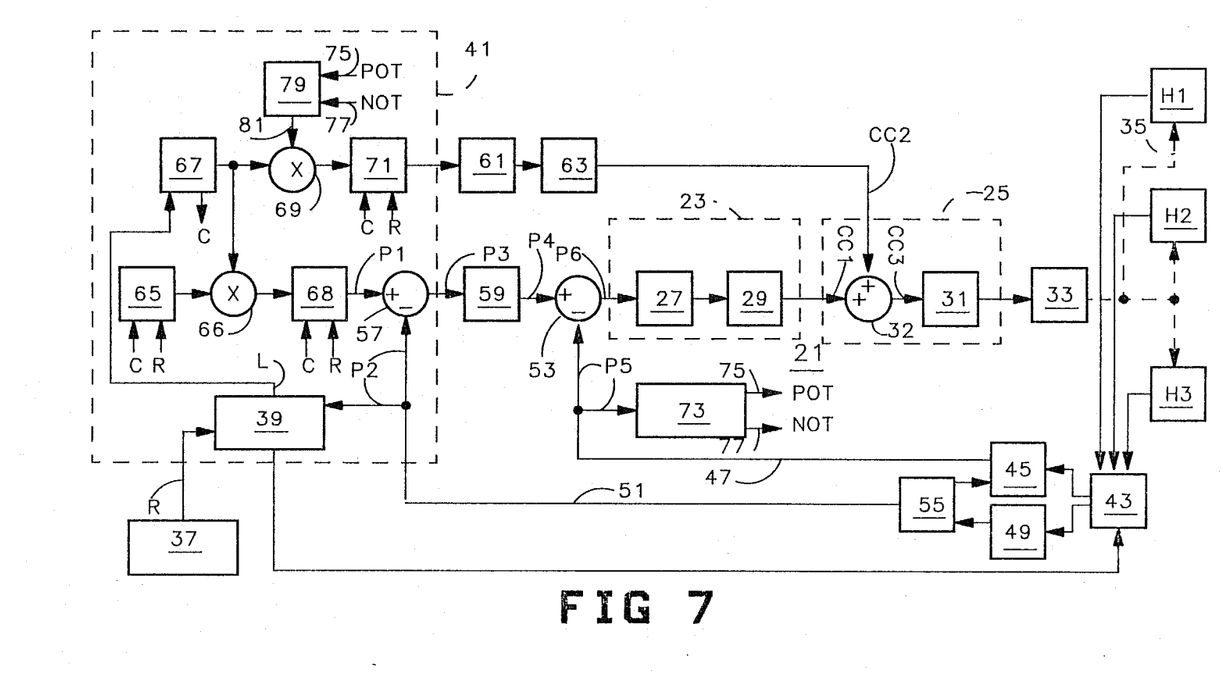
FIG. 7 is a block diagram illustrating the improved sampled servo seek and track follow control loop of this invention.

This is a sampled servo system and the magnetic heads are individually employed for both track seeking movement and track following operation. To this end a host computer 37 or other central control unit makes requests which include selecting an individual magnetic head and a track at which that head is to be positioned for reading or writing purposes. These requests are transmitted to a signal processor 39, forming part of a microcomputer or microprocessor 41, which addresses a target head select circuit 43 to couple the selected one of magnetic heads H1, H2 or H3 to a position demodulator 45 in the track follower feedback path 47 of the track follower loop and to a Gray code detector circuit 49 in a track position feedback path 51 wrapped around the track follower feedback path 47.

The input signals to the position signal demodulator 45 are the servo code signals from the selected magnetic head resulting from transducing the servo code 9 (FIG. 2). These servo code signals are amplified, filtered and subtracted by the position signal demodulator to produce the track crossing and subtrack or off-track servo code signal (A-B) used for track seeking and track following purposes. These servo code signals (A-B) are coupled to the input section 23, at the compensator circuit 27, of the track follower loop via an off-track or subtrack summing circuit 53.

The input signals to the Gray code detector 49 from the selected magnetic head are transduced from the Gray code recordings 11 of the track number in the selected magnetic track. These are converted to binary code in a Gray code to binary converter 55. The actual track number indicates whether the track is odd or even; however, as discussed in connection with FIG. 1, an odd/even bit may be recorded with the Gray code as an additional indication of whether a track is odd or even. The output of the Gray code to binary converter 55 is the actual track position, digitally expressed, of the selected magnetic head, either in the seek mode or the track following mode of operation. This digital actual track position signal is coupled as a feedback signal to one input of a desired position summing circuit 57. Signals representing odd and even track numbers are also coupled to the position demodulator 45 to provide a combined track crossing and servocode signal. The output of the position summing circuit is coupled as input to a position digital-to-analog converter 59 the output of which is coupled to the second input of the off-track summing circuit 53.

The digital desired track position trajectory signal, developed as a time varying trajectory position signal P1 (FIG. 6) in the micro-computer 41, is coupled to the second input of the position summing circuit 57. This signal which provides a position reference includes a desired track number and a subtrack position at which it is desired to position the selected magnetic head. Thus the reference position at which it is desired to position the selected head is defined, and both components of the reference position are represented in the actual track position and servo code feed back signals, respectively, in the actual track position and subtrack or off-track position feedback paths 51 and 47, to achieve precise positioning.

The acceleration profile signal CC2 developed in the micro-computer 41 is coupled via an acceleration digital-to-analog converter 61 and a slew rate circuit 63 to a second input of the summing circuit or junction 32. This is a feed forward signal which is the primary power signal to the actuator during a seek move. The closed track follower loop, now responding to the track position trajectory signal CC2, provides the small correction signals necessary to maintain alignment of the selected magnetic head 15 with the desired trajectory provided by the track position trajectory signal.

As noted, requests from the host computer 37 are coupled to the signal processor 39 which is also coupled to the feedback path 51 and receives the present track position signal and thus the actual track number at which the selected magnetic head is presently positioned. These binary signals are subtracted. The difference, defined as a selected magnetic head seek signal L, represents the direction of seek movement and the seek length, the latter in terms of the number of tracks between the present track and the selected or desired track. This number, or other number developed therefrom, is used as an address for accessing memories for storing seek reference values.

The micro-computer 41, of which the signal processor is a part, contains the memories for storing the seek reference values which include the acceleration and the position reference values. Since the actuator characteristics are well known it is possible to develop a table of feed forward acceleration commands, one acceleration value for each seek length and a signal table of full power position values. The acceleration values, which are individually addressed as a function of seek length are used to scale the full power position values to generate position values for an individual seek length. The selected acceleration value and the scaled full power position values are then used to simultaneously produce an acceleration profile signal CC2 and a track position trajectory signal P1 having the same time duration which are applied simultaneously in the single control loop for precisely performing a seek movement.

To this end the micro-computer 41 comprises an acceleration value memory 67 and a position value memory 65. The position value memory 65 comprises a table of digital track position values that would result from full power acceleration. Digital track position values under the control of clock pulses C and requests R are coupled via a multiplying operation in multiplier circuit 66 to a track position trajectory generator 68, controlled by clock pulses C and requests R, which couples the digitally expressed track position trajectory values to the summing junction 57, one at a time, in sequence, in said equal sample time intervals determined by clock pulses C, beginning with the present track and continuing to the target track of the seek movement, for either direction of seek movement. The digital track position trajectory values for each sample interval lie along, and, in fact define, the track position trajectory and correspond to a track position along the Y axis of the trajectory plot of FIG. 6. The trajectory, which is parabolic, represents the time rate of change of position of a magnetic head and defines the actuator response to the acceleration profile signal for that seek length. The specific shape of the trajectory is a function of the seek length. Since the sample time intervals are the same for all seek lengths, the number of sample time intervals in a seek movement is therefore a function of seek length.

Figure 6:
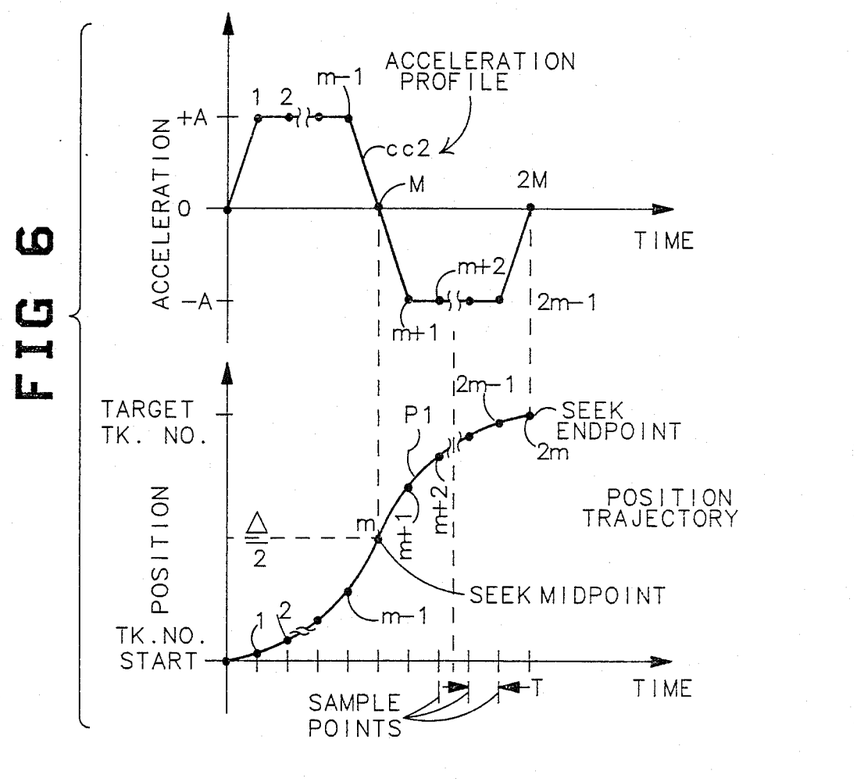
FIG. 6 plots the timing relationship of an acceleration profile signal and a reference or desired track position trajectory signal as employed in this invention.

The acceleration value memory 67 contains a table of acceleration values, discussed at a later point, the individual magnitudes of which are related to seek length. An individual acceleration value is accessed by each address expressed as the seek signal L output by the signal processor 39 and is a function of the seek length. Each acceleration value is coupled via a multiplier 69 as an input to an acceleration profile generator 71, controlled by clock pulses C and requests R, which digitally defines the desired acceleration profile. The analog equivalent of the digital acceleration profile signal CC2 from the digital-to-analog converter 61 is coupled to the slew rate circuit 63 which establishes the slope of the acceleration current transitions, as seen in FIG. 6, to match the dynamic response characteristics of the actuator.

Figure 8:
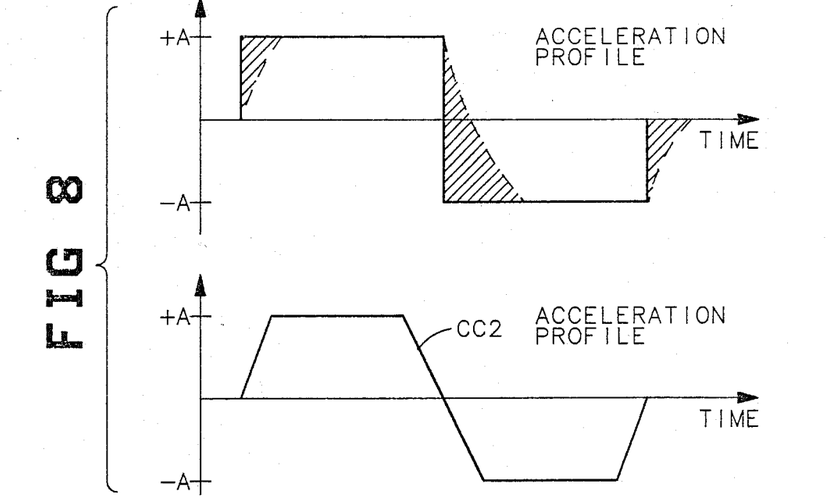
FIG. 8 compares rectangular and trapezoidal wave forms for applied acceleration (current)
Figure 9:
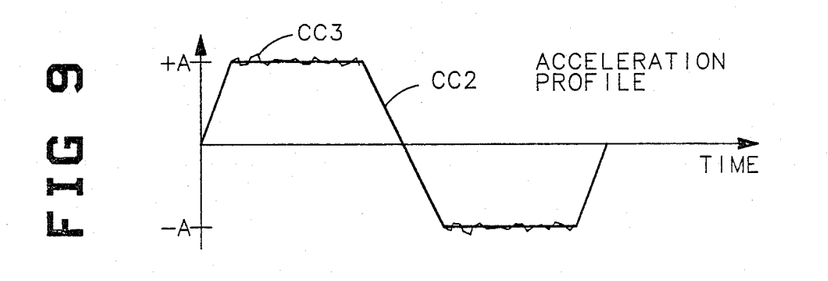
FIG. 9 depicts the function of the system in which the seek closely approximates the profile of the acceleration current applied as a feed forward signal in the control loop.
Figure 10:
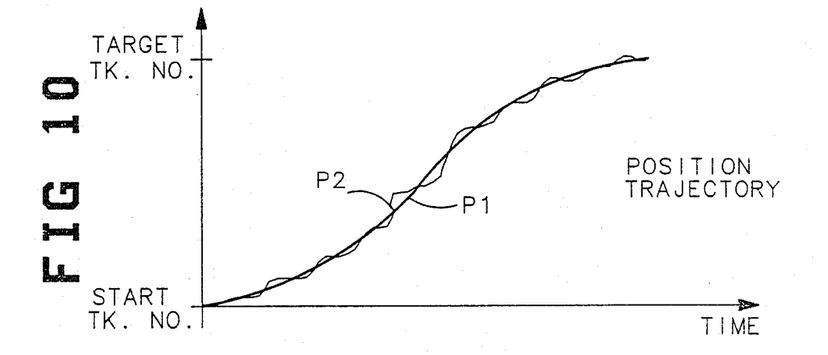
FIG. 10 depicts the function of the system in causing the actual position trajectory signal to follow the reference or the desired position trajectory signal.

The advantages of the slew rate correction are evident from FIG. 8, which compares a rectangular acceleration signal profile with the preferred trapezoidal acceleration profile signal CC2. The dotted lines defining the boundaries of the shaded areas in the rectangular profile approximate the actuator response and depict lost acceleration as the accelerating current is applied, lost deceleration at the midpoint current swing from positive to negative and lost deceleration at the end of the profile cycle as the negative current goes to zero. The area within the acceleration current profile defined between the dotted lines and the internal boundaries of the profile are unequal. Since the positive and negative magnitudes of acceleration current are the same, and since the accelerating and decelerating characteristics of the actuator are the same, it is evident that this lack of symmetry in the application of energy to the actuator during acceleration and deceleration will result in a net magnetic head velocity at the end of the seek movement, substantially as shown.

The feed forward acceleration current is applied so that the track follower control loop, which is always closed, corrects only for errors between actual track position and desired track position. That is, it follows the track position trajectory signal P1 (FIG. 6) during seek movement. Since the compensator 27 stabilizes the control loop there is no need for introducing velocity feedback.

Acceleration signal values at individual sample points in time on the acceleration profile signal CC2 translate into magnetic head positions with respect to individual tracks on the disc surface and each corresponds closely to a track position signal value on the track position trajectory signal P1 at the same point in time. Ideally the actual track position of the magnetic head, represented by the value of the present track position signal P2, is equal to the value of the track position trajectory signal P1 at each corresponding point in time, neglecting the subtrack position, if any. Differences between the track position trajectory signal P1 and the present track position signal P2 result in a digital desired position error signal P3, which is actually a partial position error signal, indicative of the error. The polarity of this error signal indicates whether overshoot or undershoot exists. The analog equivalent P4 of this error signal P3 at the output of the position digital-to-analog converter 59, is coupled to the summing junction or circuit 53 where it is algebraically summed with the analog actual subtrack position signal P5. The result is an analog final or net position error signal P6 coupled at the input section 23 of the track follower 21 to the compensator circuit 27. This error signal produces a current command signal CC1 at the output of the compensator circuit to correct for the position error P6 and which is algebraically summed at the summing circuit 32 with the acceleration profile signal CC2 current command to drive the actuator.

The sample intervals of the acceleration profile signal CC2 and the track position trajectory signal P1 controlled by clock pulses C are shown in FIG. 6. The time intervals are equal, are equal in number and are coincidental in time. The sample points are numbered and corresponding sample points are sampled at the same time in generating the respective signals. Two tables are all that are needed to define these reference signals. One is the table of values for the full power position trajectory, and the other is a table of acceleration values A, one for each seek length, or for individual groups of seek lengths, so that the midpoint and the target track end of the seek movement m and 2m, respectively, are reached on exact sample point boundaries of the acceleration profile signal CC2 of FIG. 6.

In one embodiment of this invention the sample time intervals are approximately 280 microseconds long. Calculation of a track position at each sample point along the track position trajectory usually results in a decimal number, rather than a whole number, for example, track and subtrack position number 492.2, in which the whole number 492 denotes the desired track and 0.2 denotes the subtrack position, that is, the fractional track position off track center or beyond the center of track number 492.

Referring to FIG. 7, the track reference number 492, which, as seen in FIG. 6, may be any sample point, 1, 2, m−1, etc., but not including sample point 2 m (a whole number), is the present value of the track position trajectory signal P1 sampled at a given sample point and coupled to the summing junction 57. At this instant, assume the selected magnetic head is at an actual track and subtrack position 491.4. The actual track position number, signal P2, in the feedback path 51, is 491 and the subtrack position, signal P5, in the feedback path 47, is 0.4. The digital error signal P3, subtracting 492−491=1.0, which becomes the analog signal P4 at the summing junction 53. The net position error signal P6=1.0−0.4=0.6 at the output of the summing circuit 53.

The use of a single control loop 21 for both track following and track seeking reduces the hardware parts count. It also avoids the problem of switching from a seek control system to a separate track follower system which requires settling out the residual seek velocity and the seek position error at the end of a seek movement. More importantly signal tracking errors and seek time are reduced.

The seek adaption process for correcting the acceleration profile as a function of off-track position (overshoot or undershoot) does not interfere with normal drive operation and causes succeeding seek movement to more exactly follow the desired references, acceleration and position. This adaptive process corrects for manufacturing variations that exist in the actuator motor. Consequently, by the seek adaption process, all drives have the same seek movement characteristics and the same seek times.

The seek adaptation process is implemented by developing an adaptive gain adjustment signal as a function of an off-track position (track overshoot or undershoot), evidenced by the servo code signals, which may exist at the end of a seek movement. The adaptive gain adjustment signal is used to correct acceleration values selected from the acceleration value memory 67. The adaptive gain adjustment signal may be either a fixed increment used on successive overshoots or undershoots to correct the acceleration signal, or may be proportional to the overshoot or undershoot to make the entire correction at once. Off track detection is provided by an off-track detector circuit 73 in the feedback path 47 and which responds to the servo code signal P5 to produce output signals at circuits 75 and 77 indicative, respectively, of track overshoot or undershoot. POT is Positive Off Track and indicates the magnetic head is displaced in the positive direction from track center. NOT is Negative Off Track and indicates negative direction displacement. The circuits 75 and 77 are connected to an adaptive gain adjustment value circuit 79 which is coupled by a line 81 to a multiplier 69. The adaptive gain adjustment value which is less than 1 for overshoot and greater than 1 for undershoot, corrects the acceleration values selected from the acceleration value memory 67. These corrected acceleration values are coupled to the digital acceleration profile generator 71. This circuit now produces a digital representation of the corrected acceleration profile signal CC2.

Figure 11:
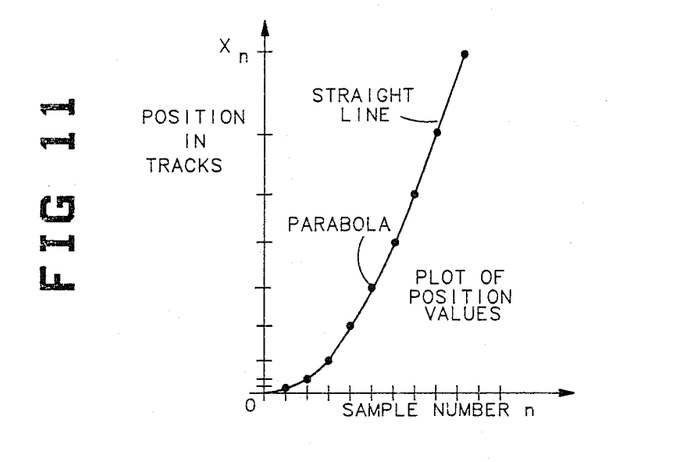
FIG. 11 is a plot of the table of position values for full power position trajectory.

A plot of track position values Xn against sample number n, for equal intervals of time, at full power, constant acceleration, is seen in FIG. 11. The curve is nonlinear, the discrete position points defining a parabola. The values Xn for each sample number are quantized and stored as a table for a full power position trajectory stored in the position value memory 65. From these values in sample intervals T a track position trajectory signal P1, such as characterized in FIG. 6, is developed.

Figure 12:
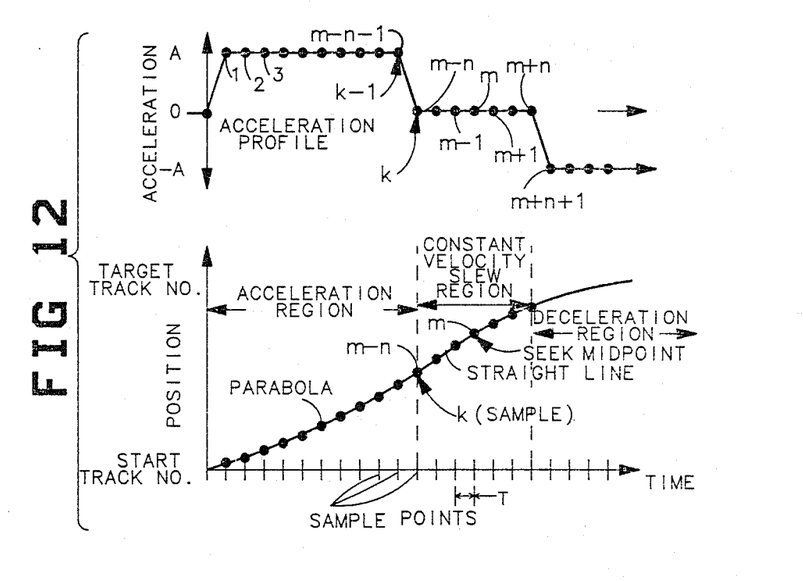
FIG. 12 plots the timing relationship of an acceleration profile signal and a desired track position trajectory signal in which a constant velocity control interval is provided.

If it is desired in long seeks to limit head velocity to some value below that resulting from full power acceleration to the seek midpoint, the acceleration current may be reduced to zero in advance of the seek midpoint and held at zero to a corresponding point beyond midpoint, at which point the acceleration current is reversed to define a reversed acceleration current profile for deceleration of the head. The area under the reversed acceleration current profile is equal to that under the head acceleration current profile for the head acceleration phase. The head moves with constant velocity when the acceleration current is zero. The time rate of change of position is linear resulting in a straight line plot of position change on the position trajectory of FIG. 12. The position values for constant velocity are also plotted in FIG. 11 over a linear section of that curve.

Scaling of position values for other than full acceleration power is achieved by multiplying the output of the position value memory 65 by the value $A/A_{FULL\text{-}POWER}$, as noted above, at the multiplying junction 66.

The manner in which the incremental values of the table for the full power position trajectory of FIG. 11 and acceleration commands are determined is explained below. In the equations which follow, the position values are determined:

Acceleration level = A (Tracks/Sec.$^2$)

Midpoint = sample #m; m = [samples]; and

T = sample interval = [seconds]

At any sample point n, the track position is given by $X_n$.

For $n = 1$;

$$X_n = \frac{AT^2}{6} = \frac{AT^2}{2}(\tfrac{1}{3})$$

-continued

For $2 \leq n \leq m - 1$ $$X_n = \frac{AT^2}{2}(n^2 - n + \tfrac{1}{3})$$

For $n = m$ $$X_n = \frac{AT^2}{2}(n^2 - n)$$

For $n = m + 1$ $$X_n = \frac{AT^2}{2}(n^2 - n - 7/3)$$

For $m + 2 \leq n \leq 2m - 1$ $$X_n = \frac{AT^2}{2}(4mn - 2m^2 - n^2 - n - \tfrac{1}{3})$$

For $n = 2m$ $$X_n = \frac{AT^2}{2}\left(\frac{n^2}{2} - n\right)$$

The equations above show that each point for a position $X_n$ during a seek is proportional to $A/2$. Therefore a look-up table of track position values based on a standard position trajectory or profile at, say, full power acceleration can be used to get all other position trajectories by scaling table values by $A/A_{FULLPOWER}$. Also only the acceleration phase of the position values needs to be in the table since deceleration values are obtained by indexing backwards through the table.

Two tables are needed.

(1) A table of values for track position $X_n$ given a full power seek (FIG. 11).

(2) A table of values of acceleration "A" to use for each seek length so that the target track and seek midpoint are reached on exact sample boundaries.

In the equations below, acceleration values are determined:

From the equation for $n = m$;

$$X_m = \frac{AT^2}{2}(m^2 - m).$$

Let $L$ = Total Seek Length;

$$X_m = \frac{L}{2}$$

i.e., midpoint $$\frac{L}{2} = \frac{AT^2}{2}(m^2 - m) \text{ and } A = \frac{L}{T^2(m^2 - m)}$$

This gives the acceleration value A necessary to do a seek movement of length L in exactly 2 m sample times using a profile of the type of FIG. 6.

An example of a calculation of the number of samples in a given seek length at maximum acceleration $A_{FULLPOWER}$ is given below.

$$A = \frac{L}{T^2(m^2 - m)}; \quad AT^2m^2 - AT^2m - L = 0$$

-continued $$m = .5 \pm \sqrt{.25 + \frac{L}{AT^2}}$$

Example:
L = 1600 Tracks; T = 280
A = 6G's = 3.7 × 10⁶ Tracks/Sec² @ 1600 Tracks/Inch
M = 74.1; This seek length would use m = 75 with A adusted to slightly less than $A_{FULLPOWER}$.

The position trajectory table (see FIG. 11) which can be read backwards, for deceleration, only needs to be 75 entries long for 1600 tracks. For deceleration the negative value of a selected acceleration value is used.

High performance seek movement is achieved whether few or many tracks are crossed.

The micro-computer which generates the acceleration profile signal CC2 and the track position trajectory signal P1 is a precision reference signal generator. These signals, as employed in the improved track follower loop, move a magnetic head to a target track in the shortest time possible. In operation:

(a) The seek movement is synchronized with the position samples 1, 2, m−1, m, etc.

(b) The exact midpoint is on a sample point, m. This guarantees that the turn around from acceleration to deceleration is made at the proper instant and at the midpoint of the seek movement.

(c) The endpoint or target track point of a seek movement is reached coincidentally with the end point 2m of the acceleration profile signal CC2.

(d) The control of the time rate of change of the acceleration current (slew rate) removes dependence on the rise time of the coil current.

(e) The reference generator is an inexpensive, yet precise, 8 bit microcomputer. An example being an 8052 microcomputer or processor made by the Intel Corporation of California.

The final or net position error signal P6 is simply formed from the odd/even track addresses and the corrected track crossing signal 19, and provides negative feedback to the track follower. This implies that any amount of head missalignment can be tolerated when switching from one head to another in the head selection process.

The application of this invention is not limited to magnetic disc drives. The general principles are practiceable using other physical phenomena for recording and reading servo codes and data.

Industrial Applicability

The improved method and apparatus for performing seek and track follow operations are applicable in all types of disc drives.

What is claimed is:

1. In a magnetic disc memory drive having, magnetic memory discs, means for rotating said discs, servo code and track number magnetically recorded in each track on said discs, a magnetic head for each disc, and a movable member supporting each magnetic head in a position to scan an adjacent disc surface and to sense said servo code for producing servo code signals and to detect said recorded track number for producing a present track position signal, a seek and track following control system, comprising:

a. a track following control loop, having an output section and an input section, said output section including an actuator which is coupled to said movable member to move said member and thereby move all magnetic heads over the adjacent surfaces of said discs;

b. means for coupling one magnetic head to said input section;

c. means for producing a desired track position trajectory signal for said one magnetic head;

d. means for producing a desired position error signal which is the difference between said desired track position trajectory signal and the present track position signal of said one magnetic head; and e. means for producing a net position error signal which is the difference between said desired position error signal and the servo code signals of said one magnetic head and for coupling said net position error signal to said input section to position said one magnetic head at the desired track.

2. Apparatus as set forth in claim 1 in which said means for producing a desired track position signal comprises:

a. means for producing a selected magnetic head signal identifying a selected magnetic head and a requested track position signal identifying a track at which said selected magnetic head is to be positioned;

b. means for producing a present track position signal indicating the present track at which said selected magnetic head is positioned;

c. means responsive to said requested track position signal and said present track position signal for producing a seek signal indicative of the seek length of a seek movement from said present track to said desired track;

d. means responsive to said seek signal for producing a time varying track position trajectory signal; and e. means for sequentially sampling said track position trajectory signal and comparing each sample with an existing present track position signal.

3. Apparatus as set forth in claim 2 in which said means for producing a time varying track position trajectory signal comprises storage means for storing a plurality of different desired track position signals individually addressed by different individual seek signals.

4. Apparatus as set forth in claim 2 further comprising:

a. means responsive to said seek signal for producing an acceleration profile signal; and b. means for coupling said acceleration profile signal to said output section of said track following control loop to provide the primary power for driving said actuator.

5. Apparatus as set forth in claim 4 wherein said last named means comprises means responsive to said acceleration profile signal for controlling the time rate of change of said acceleration profile signal.

6. Apparatus as set forth in claim 4 further comprising means responsive to said servo code signals of said selected magnetic head at the end of a seek movement for adjusting the gain of said acceleration profile signal in a sense to reduce the overshoot or undershoot of a selected magnetic head in a subsequent seek movement.

7. Apparatus as set forth in claim 6 wherein said means responsive to the servo code signals of said one magnetic head comprises:

a. an off-track detector responsive to said servo code signals for producing correction signals indicative of the magnitude of track center overshoot or undershoot; and b. an adaptive gain adjustment circuit responsive to said correction signals for adjusting the gain of said acceleration signal.

8. In a magnetic disc memory drive having magnetic memory discs, means for rotating said discs, sampled servo code and track number magnetically recorded in each track on said discs, a magnetic head for each disc, and a movable member supporting each magnetic head in a position to scan an adjustment disc surface and to sense said servo code for producing servo code signals and to detect said recorded track number for producing a present track position signal, a seek and track following control system comprising:

a. a control loop having an output section and an input section, said output section including an actuator which is coupled to said movable member to move said member and thereby move said magnetic heads over the adjacent surface of said discs;

b. means for producing a time varying track position trajectory signal of given time duration coupled to said input section of said control loop;

c. means for producing a time varying acceleration profile signal having a time duration the same as that of said time varying track position trajectory signal; and d. means for simultaneously coupling said time varying track position trajectory signal to said input section of said control loop for positioning said actuator and coupling said acceleration profile signal to said output section of said control loop to provide the primary power for driving said actuator.

9. Apparatus as set forth in claim 8 wherein said last named means comprises means responsive to said acceleration profile signal for controlling the time rate of change of said acceleration profile signal.

10. Apparatus as set forth in claim 1 further comprising means responsive to said present track position signals for producing signals indicative of odd and even numbered tracks for modifying said servo code signal resulting from track crossings during a seek movement so that the servo code signal has similar characteristics for both odd and even track crossings.

11. Apparatus as set forth in claim 1 wherein said present track position signal includes odd and even track indication signals, said odd and even track indication signals and said servo code signal are combined into a single track crossing and subtrack servo code signal so that the control loop always has negative feedback whether a magnetic head is crossing an odd or an even track.

12. Apparatus as set forth in claim 8 in which said means for producing said time varying track position trajectory signal comprises:

a. means for producing a selected magnetic head signal identifying a selected magnetic head, and a requested track position signal identifying a track at which said selected magnetic head is to be positioned;

b. means for producing a present track position signal indicating the present track at which said selected magnetic head is positioned;

c. means responsive to said requested track position signal and said present track position signal for producing a seek signal indicative of the seek length of a seek movement from said present track to said desired track; and d. means responsive to said seek signal for producing said time varying track position trajectory signal.

13. Apparatus as set for the in claim 12 in which said last named means comprises storage means for storing a plurality of different desired track position values.

14. Apparatus as set forth in claim 8 further comprising means responsive to the servo code signals of said selected one of said magnetic heads at the end of a seek movement for adjusting the gain of said acceleration signal in a sense to reduce the overshoot or undershoot of a selected magnetic head in a subsequent seek movement.

15. Apparatus as set forth in claim 14 wherein said means responsive to the servo code signals of said selected one of said magnetic heads comprises:
 a. an off-track detector responsive to said servo code signals for producing correction signals indicative of the magnitude of track center overshoot or undershoot; and
 b. an adaptive gain adjustment circuit responsive to said correction signals for adjusting the gain of said acceleration signal.

16. Apparatus as set forth in claim 13 further comprising means responsive to said acceleration signal for modifying signals from said storage means.

17. Apparatus as set forth in claim 2 in which said means for producing a time varying track position trajectory signal comprises:
 a. means for storing a single full power position value table; and
 b. means responsive to an addressed full power position value for producing said track position trajectory signal.

18. Apparatus as set forth in claim 17 in which said last named means comprises:
 a. a multiplying circuit coupled to said means for storing a single full power position value table and scaling said addressed full power position value; and
 b. a track position trajectory generator coupled to said multiplying circuit.

19. Apparatus as set forth in claim 17 further comprising:
 a. means for storing different individual acceleration values, wherein differing seek signals address corresponding individual acceleration values; and
 b. means for coupling an addressed acceleration value to said output section of said track following control loop to provide the primary power for driving said actuator.

20. Apparatus as set forth in claim 19 in which said last named means comprises an acceleration profile generator responsive to said addressed acceleration value for producing an acceleration profile signal having a predetermined profile and having a time duration corresponding to that of said track position trajectory signal.

21. Apparatus as set forth in claim 20 further comprising:
 a. means providing an equal number of equal sampling intervals for said track position trajectory signal and said acceleration profile signal; and
 b. means for sampling said track position trajectory signal and said acceleration profile signal in the same interval of time.

22. In a disc memory drive having memory discs, means for rotating said discs, sampled servo code and track number recorded in each track on said discs, at least one transducer for each disc, and a movable member supporting each transducer in a position to scan an adjacent disc surface and sense said servo code and detect said recorded track number for producing servo code signals and a present track position signal, a seek and track following control system comprising:
 a. a track following control loop, having an output section and an input section, said output section including an actuator which is coupled to said movable member to move said member and thereby move said transducers over the adjacent surface of said discs;
 b. means for coupling one transducer to said input section of said track following control loop;
 c. means for producing a seek signal indicative of seek length;
 d. means responsive to said seek signal for producing an acceleration profile signal coupled to said output section of said track following control loop; and
 e. means responsive to said seek signal for producing a track position trajectory signal coupled to said input section of said track following loop.

23. In a disc drive having a motor driven actuator structure with a transducer mounted thereon, a method for controlling said actuator structure for moving said transducer over a memory disc surface and for positioning said transducer over a selected track on said memory disc surface, comprising the steps of:
 a. generating a time varying track position trajectory signal;
 b. employing one transducer to generate a present track position signal identifying the actual track at which said one transducer is positioned;
 c. algebraically combining sequentially sampled portions of said time varying track position trajectory signal and sequential present track position signals as said transducer moves to produce position error signals;
 d. employing said transducer to generate subtrack position signals when said transducer is between tracks;
 e. algebraically combining said subtrack position signals with said position error signals to generate net position error signals; and
 f. employing said net position error signals to control said motor driven actuator.

24. The method according to claim 23 further comprising the step of developing stability compensated position error signals from said net position error signals to control said actuator.

25. The method according to claim 24 further comprising the steps of:
 a. developing an acceleration profile signal for controlling said actuator; and
 b. algebraically combining said acceleration profile signal with said stability compensated final position error signal to produce an actuator drive signal to drive said actuator.

26. In a disc drive having a motor driven actuator structure with a transducer mounted thereon, a method for controlling said actuator structure for moving said transducer over a memory disc surface and for positioning said transducer over a selected track on said memory disc surface, comprising the steps of:

a. producing a time varying acceleration profile signal having a profile and a time duration which is a function of a seek length;
b. producing a time varying track position trajectory signal as a function of seek length and of the same time duration as said acceleration profile signal;
c. successively sampling signal values of said time varying acceleration profile and track position trajectory signals at the same points in time; and
d. successively simultaneously applying acceleration profile signal and track position trajectory signal values from the same points in time to said motor driven actuator to drive said actuator and to position said actuator at a selected track, respectively.

27. The method according to claim 26 further comprising the steps of:
a. producing an present track position signal as said transducer crosses each track; and
b. comparing each present track position signal with an existing sampled track position trajectory signal to produce successive position error signals for positioning said actuator.

28. The method according to claim 27 further comprising the step of combining each position error signal with an existing sampled acceleration profile signal value.

29. The method according to claim 27 further comprising the steps of:
a. producing a subtrack position signal indicative of the position from a track center of said transducer; and
b. combining said subtrack position signal with an existing position error signal.

30. The method according to claim 26 further comprising the steps of:
a. producing a subtrack position signal at the end of a seek movement indicative of overshoot or undershoot of a desired track; and
b. modifying said acceleration profile signal with said subtrack position signal to correct track overshoot or undershoot.

31. The method according to claim 29 further comprising the step of modifying said acceleration profile signal with said subtrack position signal to correct track overshoot or undershoot.

32. The method according to claim 26 comprising the further step of shaping said acceleration profile signal to provide a time rate of change of the acceleration profile signal profile compatible with the response of said motor driven actuator.

* * * * *

UNITED STATES PATENT AND TRADEMARK OFFICE
CERTIFICATE OF CORRECTION

PATENT NO.    : 4,775,903

DATED         : October 4, 1988

INVENTOR(S)   : Vernon L. Knowles

It is certified that error appears in the above-identified patent and that said Letters Patent is hereby corrected as shown below:

Column 14, line 11, delete "adjustment", insert --adjacent--.

Column 16, line 26, after "following", insert --control--.

Signed and Sealed this

Twenty-sixth Day of December, 1989

Attest:

JEFFREY M. SAMUELS

*Attesting Officer*     *Acting Commissioner of Patents and Trademarks*